R. H. SMITH.
Soldering-Tools.
No. 150,981. Patented May 19, 1874.
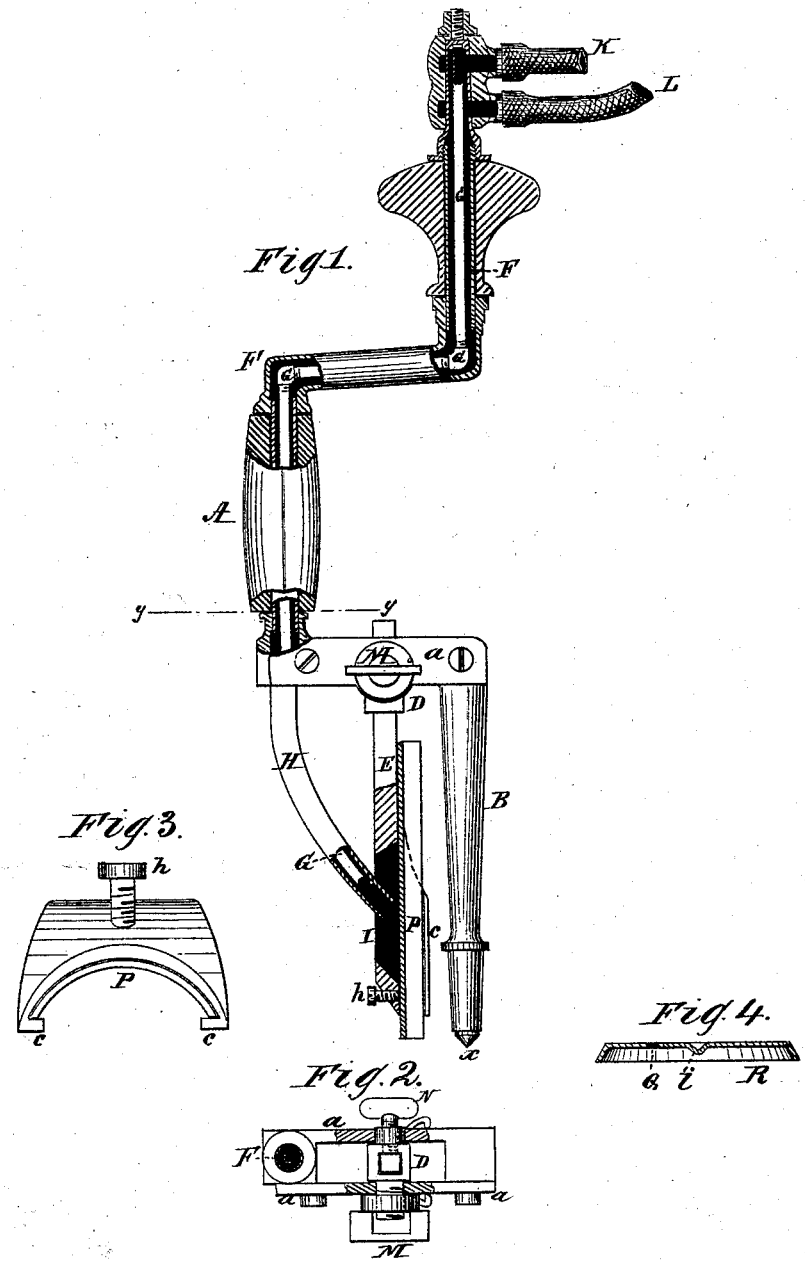

UNITED STATES PATENT OFFICE.

RICHARD H. SMITH, OF BALTIMORE, MARYLAND.

IMPROVEMENT IN SOLDERING-TOOLS.

Specification forming part of Letters Patent No. 150,981, dated May 19, 1874; application filed March 18, 1874.

*To all whom it may concern:*

Be it known that I, RICHARD HENRY SMITH, of Baltimore city, State of Maryland, have invented a new and useful Improvement in Tools for Capping Cans; and I do hereby declare that the following is a full, clear, and exact description of the same, reference being had to the accompanying drawing, forming a part of this specification, in which—

Figure 1 is a partly-sectional elevation of the soldering implement. Fig. 2 is a cross-section. Fig. 3 is an end view of the capper-holder. Fig. 4 is a cross-section of the can top or cover.

The invention relates to an improved construction of revolving hand soldering-tools, as hereinafter described and claimed.

The base A is of the usual cranked form. The stem or lower vertical part B has a conical point, $x$, and the lower horizontal arm is formed of two parallel bars, $a$, in which the socket D of the tool or capper holder E is journaled. The parts of the brace above the bars $a$ are made hollow, to form a conduit or passage, F, for the gas and for the air tube G, which is arranged centrally or axially therein. Below the bars $a$ the curved burner-tube H forms an extension of the same, F G, and terminates at a point opposite, or nearly so, to the middle of the vertically-elongated slot I in the capper-holder E. The flexible or rubber pipes K and L connect, respectively, with the air-tube G and gas-tube F at the top of the brace above the swiveled bearer or swiveled head, and will, in practice, lead to conveniently-located gas-reservoir and air-forcing apparatus. One of the journals of the socket D projects laterally beyond the side of the bar $a$, through which it passes, and is screw-threaded externally, to adapt it to receive the thumb-nut M, by whose frictional contact with the bar the socket is clamped at any desired angle vertically, or relatively, to the stem B of the brace. The other or opposite journal is tubular, and screw-threaded to adapt it to receive the thumb-screw N, which clamps the polygonal shank of the capper-holder in the adjustment required by the diameter of the cans or can-tops to be soldered. The capper-holder is made concave on its face or side toward the stem B, and provided with a shoulder, rim, or rib, $c$, on the sides or edges, to adapt it to hold and guide the capper P, which is a long sheet-metal plate, curved in cross-section, corresponding to the face of the holder E. It is secured, in any adjustment, by a set-screw, $h$.

As ordinarily constructed and used, the cappers of soldering-tools require occasional pointing or sharpening, and are worthless when partly worn away.

The form of capper here shown, and its manner of attachment to the holder, enable it to be entirely utilized without pointing, since a new and fresh piece may be inserted above the part partially worn away, and the two fed downward together.

Can-tops have been made with a small central perforation, to center the bit or pivot-stem of the soldering-brace; and said stem has been constructed with an opening, to adapt it to permit the escape of gas or steam from the opening during the sealing operation. This method is open to serious objections, chiefly in that the orifice is liable to become choked or stopped, thus causing the gas or steam to find exit elsewhere around the edge of the cover.

To obviate the difficulty, I construct the top R with a central indentation, $i$, to receive the imperforate conical point $x$ of the stem B, and provide it with a gas-escape orifice, $q$, located at any convenient point between the center and rim or edge of the cover. Thus the soldering operation may be effected with greater convenience, rapidity, and safety than heretofore.

It is not always necessary that the gas have much head, since the air forced through the inner tube, acting on the injector principle, will draw the gas from the reservoir, and, the two commingling, the inflammability of the gas will be increased, and an intensely hot flame produced.

The flow of air or gas will be suitably regulated by stop-cocks, in the well-known manner. The gas employed will be, preferably, the ordinary bituminous variety.

The operation is readily understood. The soldering device being properly connected with the forcing apparatus, and the capper having become duly heated, the stem B is centered on the can-cover, (the capper-holder having been previously adjusted to suit the diameter of the cover,) and the brace is revolved in contact with a piece or pieces of solder.

Having thus described my invention, what I claim is—

1. The combination, with the revolving burner-tube H, of the capper-holder E, having an elongated slot, and the capper P, as shown and described.

2. The combination of the capper P, curved as shown, the holder E, having a concave face and guide shoulder or rim $c$, as shown and described.

3. The combination of the socket D, having screw-threaded projecting trunnion, and the thumb-nut M, with the bars $a$, substantially as shown and described.

4. The capper-holder E, the socket D, having screw-threaded journals, the thumb-nut M, and clamp-screw N, with the revolving brace, substantially as described.

RICHARD HENRY SMITH.

Witnesses:
THOMAS J. TAYLOR,
R. HENRY SMITH, Jr.